United States Patent
Egashira et al.

[11] Patent Number: 5,849,245
[45] Date of Patent: Dec. 15, 1998

[54] WELL BRICK OF VESSEL FOR MOLTEN METAL

[75] Inventors: Hiroaki Egashira, Gifu; Hideaki Mizuno, Nagoya, both of Japan

[73] Assignee: Tokyo Yogyo Kabushiki Kaisha, Tokyo, Japan

[21] Appl. No.: 864,096

[22] Filed: May 28, 1997

[30] Foreign Application Priority Data

May 28, 1996 [JP] Japan .................................. 8-154804

[51] Int. Cl.⁶ ..................................................... C21B 3/00
[52] U.S. Cl. .......................... 266/275; 266/286; 222/591; 222/594
[58] Field of Search .................................... 222/590, 591, 222/594, 606; 266/236, 275, 286; 106/57

[56] References Cited

U.S. PATENT DOCUMENTS

| | | | |
|---|---|---|---|
| 4,125,407 | 11/1978 | Ueno | 106/57 |
| 5,198,126 | 3/1993 | Lee | 222/606 |
| 5,348,202 | 9/1994 | Lee | 222/606 |

*Primary Examiner*—Scott Kastler
*Attorney, Agent, or Firm*—Carol I. Bordas; Michael J. Kline

[57] ABSTRACT

The present invention relates to a well brick or a tuyere brick for receiving a nozzle brick or a porous brick for injecting gas which is disposed on the bottom of a vessel for molten metal. A well brick is disposed on a bottom of a vessel for molten metal, and comprises a product formed into a shape of a cylinder or a frustum of cone by using an isostatic press. The well brick is made by mixing a raw material comprising aggregate of $Al_2O_3$ as a main element, 0.3 to 10.0 weight % carbon material, 0.2 to 0.5 weight % metal or metallic powder of at least one element selected from the group consisting of Al, Mg, Ca and Si, and 0.1 to 30 weight % Mg and thermosetting resin as a binding material and by forming them.

5 Claims, 4 Drawing Sheets

F I G. 3a
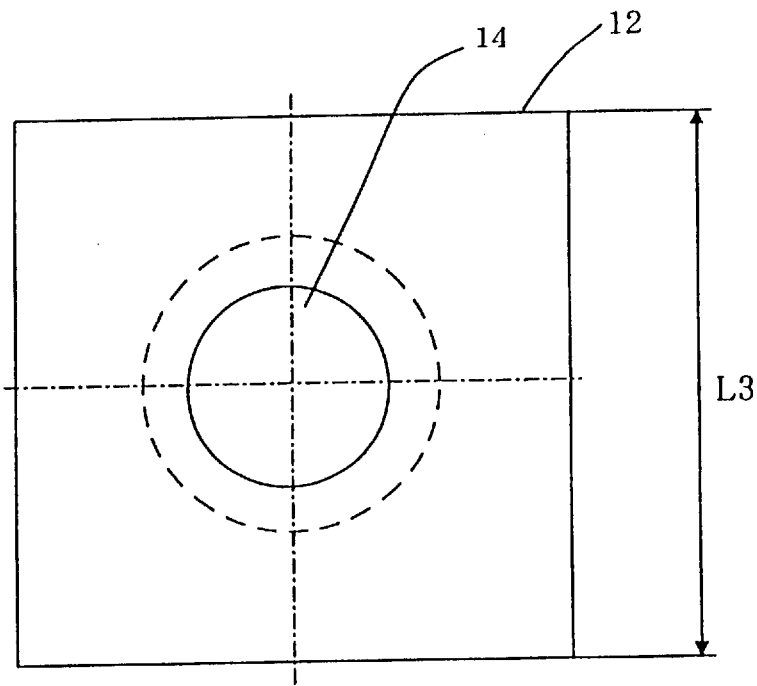
F I G. 3b
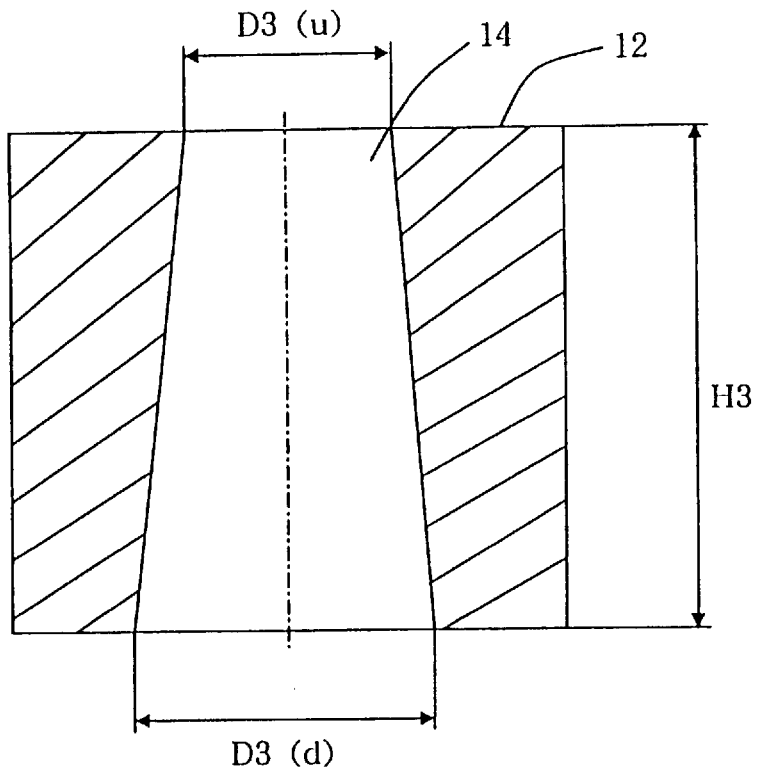

WELL BRICK OF VESSEL FOR MOLTEN METAL

FIELD OF THE INVENTION

The present invention relates to a well brick or a tuyere brick for receiving a nozzle brick or a porous brick for injecting gas which is disposed on the bottom of a vessel for molten metal such as a ladle, various types of ladles for refining, a tundish, or the like.

DESCRIPTION OF THE PRIOR ART

As shown in FIG. 3 and FIG. 4, for example, a conventional well brick for receiving a nozzle brick of a vessel for molten metal or a porous brick for injecting gas has a hole 14 and 16 in the shape of a frustum of a cone, in the center of a rectangular brick 12, for inserting a nozzle brick for discharging molten metal or a porous brick for injecting an inert gas for stirring the molten metal in a ladle. The well brick like this has been integrally formed by a hydraulic press or a friction press because it is big in size. And the brick has, for example, a rectangular contour of 200–500 mm and a height of 150–500 mm.

A burnt brick of zirconium or alumina or a precast product of $Al_2O_3$—C or the like is used as the material of above described well brick for molten metal. But because this well brick is large in size, if it is a burnt product made by a press forming technique, from a viewpoint of physical property, it has high porosity, low bulk specific gravity and low strength and thus it is greatly fused by the molten metal to have a short life.

Moreover, since a precast product of $Al_2O_3$—C is a molded product using alumina cement, it has problems that it has high porosity and thus is impregnated with slag and is apt to be spalled.

Accordingly, the above have a short life as a well brick and thus a shorter life than a side wall brick or a bottom brick of a vessel for molten metal, thereby shortening a life of lining refractory material such as a side wall brick or a bottom brick of a vessel for molten metal and increasing a unit consumption of the lining refractory material and manufacturing cost of steel.

Therefore, there is a desire to increase the life of the well brick.

To be more specific, when the nozzle brick or the porous brick for injecting gas is fixed into the above described well brick, they are inserted into the above described hole in the shape of a frustum of a cone and fixed with refractory mortar or the like. The nozzle brick or the porous brick for injecting gas usually has a life of one charge and thus is frequently replaced.

Therefore it is necessary to remove sticking material such as skull on the surface fixing the nozzle brick or the porous brick for injecting gas (hereinafter referred to as "a nozzle brick or the like") into the well brick; the well brick is therefore exposed to severe environmental conditions such as fusion damage caused by oxygen cleaning, mechanical shock by an inserting or removing operation or wear caused by molten metal flow or the like.

Moreover, the nozzle brick or the like needs to have erosion resistance to slag in the vessel for molten metal. Further, because the conventional well brick is large in size, it also has problems that it has a long manufacturing term and is frequently deformed, strained or cracked when it is burned.

Furthermore, because the well brick is large in size and has a complex shape, it has a low packing degree of material and its quality varies widely.

In particular, since a precast of $Al_2O_3$—C is a molded product of alumina cement and contains carbon material, it has many problems such as variance in the packing degree and low strength and thus it has been desired to solve these problems.

Thus in Examined Utility Model Publication No. 61-45964 a well brick is divided into an upper well brick and a lower well brick to disperse thermal stress during its use and thus to prevent breaking. But it is inconvenient when laying brick to make the well brick in two parts.

SUMMARY OF THE INVENTION

It is an object of the present invention to provide a well brick which is a little impregnated with slag, has a little skull or the like stuck thereon, has a high degree of packing raw material of the well brick, has low porosity and, in addition, has a long life with high strength, thereby improving a manufacturing yield.

The inventors of the present invention discovered, through intense study of solving the above described problems, that it is possible to increase the degree of packing the brick, to increase a density thereof and thus to eliminate drawbacks such as laminating or cracking by applying an isostatic pressing method, instead of the conventional forming method in order to form the well brick containing carbon material, thereby accomplishing the following invention.

The first embodiment of the present invention is a well brick, regardless of its refractory composition, to be disposed on a bottom of a vessel for molten metal which is formed into a shape of a cylinder or a frustum of a cone by using an isostatic press (CIP).

It is possible to increase the degree of packing of the well brick, regardless of its refractory composition, uniformly in three-dimensional direction and thus to increase a density thereof by forming the well brick into a shape of a cylinder or a frustum of a cone by using an isostatic press (CIP) which can press the well brick in three-dimensional direction. Moreover, by forming the well brick into a shape of a cylinder or a frustum of a cone it is possible to make thermal stress produced during use occur uniformly in the well brick and thus, it is possible to improve the life of the well brick.

The second embodiment of the present invention is the well brick of a vessel for molten metal being made by mixing a raw material comprising aggregate of $Al_2O_3$ as a main element, 0.3 to 10.0 weight % carbon material, 0.2 to 0.5 weight % metal or metallic powder of at least one element selected from the group consisting of Al, Mg, Ca and Si, and 0.1 to 30 weight % Mg, and thermosetting resin as a binding material and forming it into the well brick.

Since the aggregate of $Al_2O_3$, or grained $Al_2O_3$ has high thermal shock resistance, it is most suitable that it be the main element of the well brick. The raw material comprising 0.3 to 10.0 weight % carbon material, 0.2 to 0.5 weight % metal or metallic powder of at least one element selected from the group consisting of Al, Mg, Ca and Si, and 0.1 to 30 weight % Mg, and the thermosetting resin as a binding material are added to the aggregate and mixed together, and then they are formed into the well brick by using an isostatic press (CIP). The well brick formed in this way has a particularly long life.

The third embodiment of the present invention is the well brick of a vessel for molten metal, wherein the above described thermosetting resin is made by blending at least one resin selected from the group consisting of phenolic resin, urea resin, epoxy resin, and urethane resin. It is considerably easy and inexpensive to get the above described phenolic resin, urea resin, epoxy resin, and urethane resin on the market and they are convenient to manufacturing the well brick. Moreover, after the well brick is used, these resins will harden refractory material as a raw material to improve the strength thereof.

The fourth embodiment of the present invention is a well brick of a vessel for molten metal, wherein said vessel for molten metal is any one of a ladle for molten metal, a ladle for refining, or a tundish for continuous casting. Any one of a ladle for molten metal, a ladle for refining, or a tundish uses a nozzle brick or a porous brick for injecting gas. Because the nozzle brick or the like according to the present invention has a long life, it is effectively used for these bricks.

BRIEF DESCRIPTION OF THE DRAWINGS

FIG. 3a and FIG. 3b show a top view and a cross-section view, respectively, of a shape of a conventional well brick.

DETAILED DESCRIPTION OF THE INVENTION

Figure 1A:
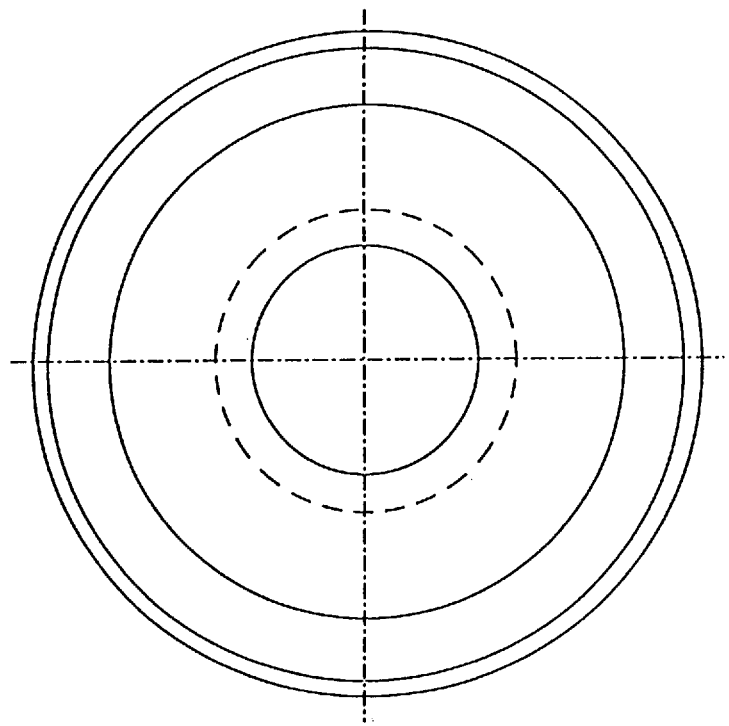
FIG. 1a and FIG. 1b show a top view and a cross-section view, respectively, of an embodiment of a well brick according to the present invention.

Because a hydraulic pressing or a friction pressing, which is a kind of conventional pressing method, is an axial pressing method, it results in a low degree of packing of the raw material. Therefore, in the present invention a well brick disposed on a bottom of a vessel for molten metal is formed into a shape of a cylinder or a frustum of a cone by using an isostatic press (CIP) which can compress it in the three-dimensional direction.

Because the well brick is integrally formed by use of the isostatic press (CIP), it becomes uniform and dense in the degree of packing in the three-dimensional direction, thereby having remarkably improved strength.

Moreover, it is possible to increase the degree of packing the well brick uniformly in the three-dimensional direction and thus to increase the density thereof by forming the well brick into a shape of a cylinder or a frustum of a cone. Further, by forming the well brick into a shape of a cylinder or a frustum of a cone it is possible to make thermal stress produced during use occur uniformly in the well brick and thus it is possible to reduced the occurrence of cracking during its use.

Because the aggregate of $Al_2O_3$ has high thermal shock resistance, it is most suitable to be the main element. To be more specific, sintered alumina of about 98 weight % $Al_2O_3$, fused alumina of about 99 weight % $Al_2O_3$, bauxite of about 90.8 weight % $Al_2O_3$ or the like can be used. And it is desirable that a grain size of about 1 to 5 mm be used. Carbon material is blended to improve the resistance of the well brick being impregnated with slag. Natural graphite, artificial graphite, pulverized pitch, amorphous carbon, carbon coke or the like is used as carbon material. If carbon material is less than 0.5 weight %, an effect of the carbon material, or the resistance of the well brick being impregnated with slag, is not sufficient and thus spalling resistance also becomes worse.

On the other hand, if carbon material is more than 10 weight %, the degree of packing of the raw material is decreased and the strength is also decreased. Thus, for example, wear resistance to molten metal or slag is also decreased and therefore it is desirable that carbon material is from 0.5 to 10 weight %. When graphite is used as carbon material, it is desirable that a grain size of about 0.043 to 0.2 mm be used.

When metallic powder is added, it reacts with $Al_2O_3$, MgO or the like in the matrix and has a great effect on preventing carbon material from oxidizing and improving the strength. It is desirable that the metallic powder is the powder of a metal or an alloy of at least one element selected from the group consisting of Al, Mg, Ca, and Si. It is because these metallic powder reacts with $Al_2O_3$, MgO or the like in the matrix to become oxides and thus accelerates binding the raw material to improve the strength thereof. If the metallic powder is blended in less than 0.3 weight %, its effect can not be generated and if the metallic powder is blended in more than 0.5 weight %, wear is accelerated by molten metal flow because the metal is softened and fused. Accordingly, the metallic powder is blended in from 0.3 to 5.0 weight %. It is desirable that a grain size of the metallic powder being about 0.043 to 0.2 mm be used.

Because MgO improves erosion resistance of the raw material to slag and gives proper remaining expansion, it is suitable to add MgO in the amount of from 0.1 to 30 weight %. It is desirable that a grain size of MgO of about 0.150 to 3 mm be used.

Because the well brick according to the present invention is used as a non-burnt brick, thermosetting resin is blended as a binding material.

The thermosetting resin is made by blending at least one resin selected from the group consisting of phenolic resin, urea resin, epoxy resin, and urethane resin. It is considerably easy and inexpensive to get the above described phenolic resin, urea resin, epoxy resin, and urethane resin on the market and they are convenient to manufacturing the well brick. Moreover, if the well brick is used for a ladle, these resins will harden refractory material of the raw material to improve the strength thereof.

EXAMPLE NO. 1

Figure 1B:
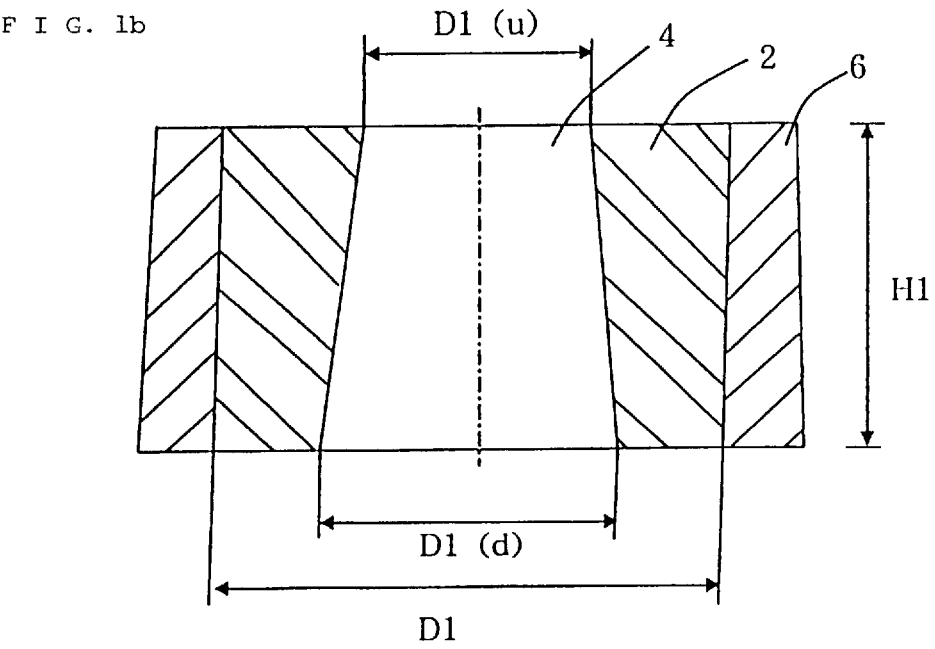

Referring now to the examples, the present invention is described. Metallic Al of 1.0 weight % and phenolic resin of 3.0 weight % were added to a raw material having composition of elements shown in Table 1 and they were mixed and then were formed into a well brick shown in FIG. 1, which is a receiving brick for a porous brick. This well brick has an outside diameter (D1) of 320 mm, a height (H1) of 210 mm, an upper diameter of an inner hole (D1 (u)) of 143 mm, a lower diameter of an inner hole (D1 (d)) of 187 mm. This well brick was formed by using an isostatic press at a pressure of 1 ton/cm².

EXAMPLE NO. 2

Figure 2:
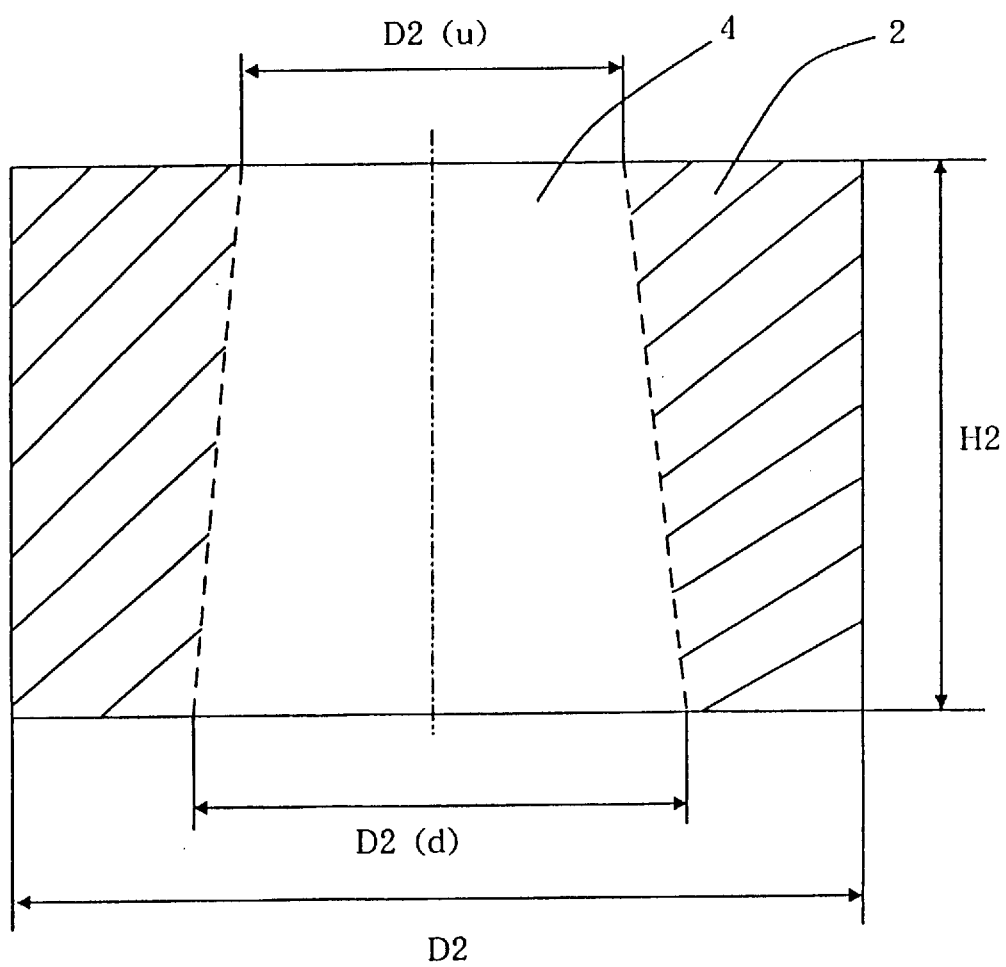
FIG. 2 shows a cross-section of another embodiment of a well brick according to the present invention.
Figure 4A:
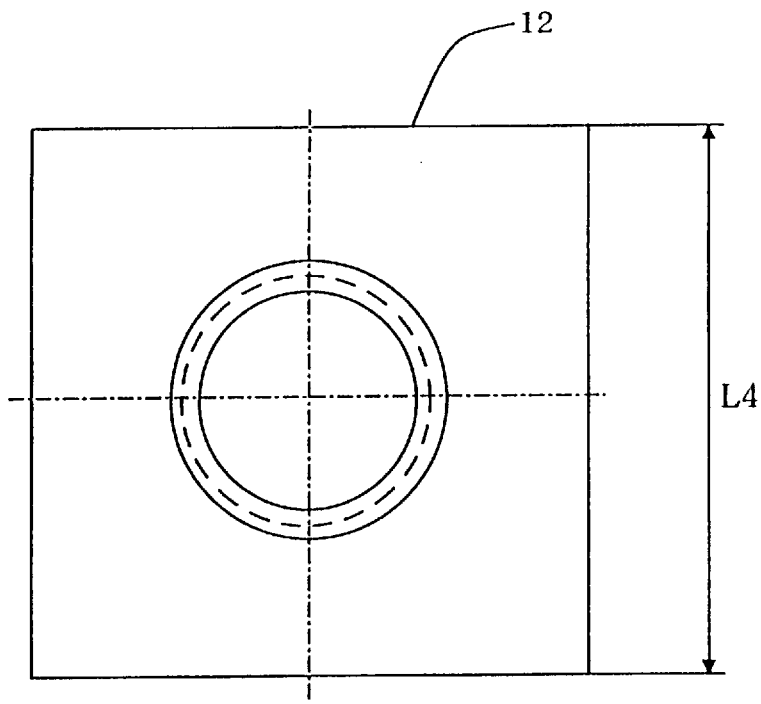
FIG. 4a and FIG. 4b show a top view and a cross-section view, respectively, of a shape of a conventional well brick.
Figure 4B:
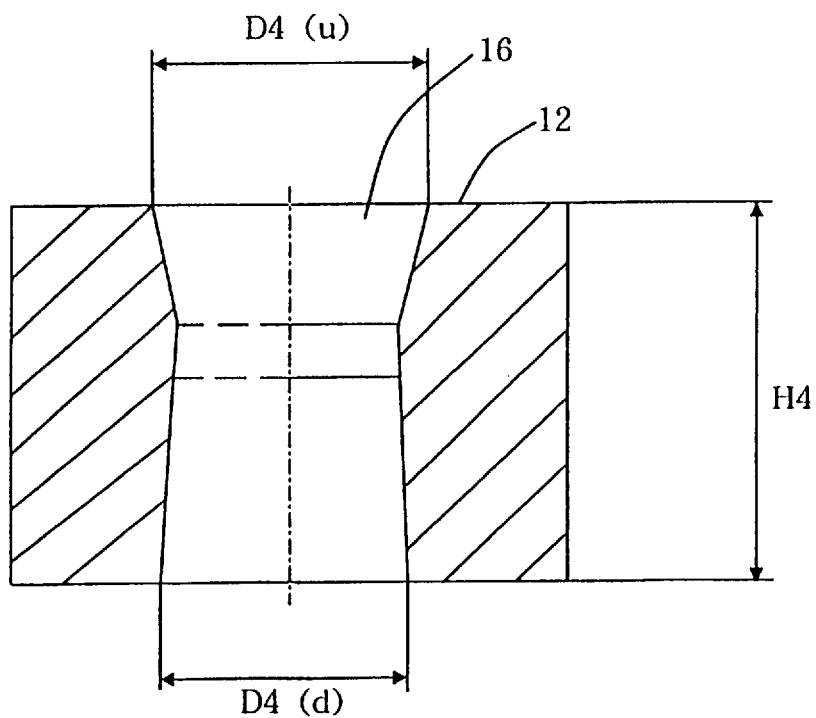

A well brick for a ladle of molten steel as shown in FIG. 2 was made as another example. This well brick has an outside diameter (D2) of 365ø mm, a height (H2) of 300 mm, an upper diameter of an inner hole (D2 (u)) of 159 mm, a lower diameter of an inner hole (D2 (d)) of 220 mm. This well brick has the same conditions in other points as the above described example.

EXAMPLE NO. 3

As a comparative example, a well brick of a conventional rectangular shape as shown in FIG. 3 and having an outside dimension (L3) of 420 mm and a height (H3) of 387 mm was formed by using a friction press of 500 ton and then a hardening processing (250° C.×10 hours) was applied to it to make a well brick.

Table 1 shows chemical elements and physical properties of the products according to the present invention No. 1 to No. 3 and those of comparative products No. 4 to No. 6. A wear test was performed with a rotating drum method. This test was performed as follows: a plurality of samples with trapezoidal sections (the upper side is 50 mm, the base is 90 mm, the height is 60 mm, the leg is 115 mm) were made of the well brick according to the present invention and the well brick of the comparative product and then these samples were stuck to the inner wall of a plurality of drums and then fused slag (whose component comprised 45 weight % CaO, 30 weight % $SiO_2$, 10 weight % $Al_2O_3$ and 15 weight % FeO) was poured into the drums and then the drums were rotated with their axes horizontal and thereafter wear was measured. In this test, the degree of wear was measured with the wear of the product No. 1 according to the present invention as a wear index of 100.

Moreover, a slag fusion damage index was measured as follows: a plurality of samples were made of the above described product according to the present invention and the comparative product and then these samples were stuck to the inner wall of a small induction furnace and then fused slag (whose elements were the same as the above described fused slag) was poured into the drum and thereafter fusion damage was measured. In this case, the degree of fusion damage was also measured with the fusion damage of the invented product No. 1 according to the present invention as a slag fusion damage index of 100. Moreover, as for the number of occurrences of cracking, the samples after the above described rotating drum testing were cut and the length of the crack in the cut surface was measured and then the number of occurrences of cracking was displayed with the length of 10 mm as one unit.

As clearly shown in Table 1, in physical properties, the cylindrical well brick according to the present invention made by an isostatic press has lower porosity and higher bulk specific gravity than the conventional well brick and it has greatly improved wear index and slag fusion damage index.

As clearly shown in Table 1, the cylindrical well brick according to the present invention is better in the number of occurrences of cracking, wear index and slag fusion damage index than the conventional well brick. And the above described well brick was actually used in the ladles of 50 ton and 300 ton and number of uses (number of heat) were counted. The result is shown in Table 2. The well brick according to the present invention was less impregnated with slag and had less skull or the like, no breakage and no crack and thus had good spalling resistance, thereby having a longer life which was two times the life of the conventional well brick.

As described above, because the well brick according to the present invention is formed into a shape of a cylinder or a frustum of a cone by an isostatic press and includes aggregate of $Al_2O_3$ as a main element, the life of the well brick is more than two times that of the conventional well brick even if it is put into contact with molten metal and is heated and cooled many times, and therefore can improve the life of many kinds of ladles, thereby producing a remarkable improvement. And it is needless to say that the above described brick is used as not only a well brick but also other kind of brick which is heated and cooled many times. While the present invention has been described in conjunction with a preferred embodiments thereof, it is evident that many alternatives, modifications and variations will be apparent to those skilled in the art. Accordingly, it is intended to embrace all such alternatives, modifications, variations and equivalents that fall within the spirit and broad scope of the appended claims.

TABLE 1

| | Quality Index | | | | | |
|---|---|---|---|---|---|---|
| | Invented Product | | | Comparative Product | | |
| | No. 1 | No. 2 | No. 3 | No. 4 | No. 5 | No. 6 |
| $Al_2O_3$ (wt %) | 85.0 | 80.0 | 72.0 | 85.0 | 80.0 | 72.0 |
| MgO (wt %) | 2.0 | 5.0 | 15.0 | 2.0 | 5.0 | 15.0 |
| C (wt %) | 1.5 | 3.5 | 7.5 | 1.5 | 3.5 | 7.5 |
| Porosity (vol %) | 5.0 | 5.3 | 5.6 | 11.5 | 12.3 | 14.6 |
| Spec. density gr/cm$^3$ | 3.10 | 3.07 | 3.06 | 2.85 | 2.81 | 2.80 |
| Compres. strength (Mpa) | 105 | 98 | 96 | 45 | 42 | 40 |
| Number of Occurrences of Cracking | 0 | 0 | 0 | 0 | 0 | 0 |
| Wear Index *1 | 100 | 103 | 104 | 135 | 147 | 168 |
| Slag Fusion Damage Index *2 | 100 | 91 | 86 | 151 | 163 | 179 |

*1 Wear index was calculated with the invented product No. 1 according to the present invention as a wear index of 100 from the result of a rotating drum method. Test conditions: temperature 1650° C., 30 min. × 6 times. slag basicity C/S (=$CaO/SiO_2$) = 1.5, number of revolution 40 r.p.m.
*2 Slag fusion damage was tested by lining an induction furnace with the product and the slag fusion damage was calculated with the product No. 1 according to the present invention as a slag fusion damage index of 100. Test conditions: temperature 1650° C., 6 hours, slag basicity C/B (=$CaO/SiO_2$) = 1.5

TABLE 2

| Result of Practical Test | | |
|---|---|---|
| | Number of Practical Life | |
| | Invented Product No.1 | Conventional Product No.2 |
| 50 ton Ladle | 22 | 10 |
| 300 ton Lade | 50 | 30 |

Unit: Number of Heat

We claim:
1. A well brick of a vessel for molten metal, wherein said well brick is made by mixing a raw material comprising an aggregate of $Al_2O_3$ as a main element, 0.3 to 10.0 weight % carbon material, 0.2 to 0.5 weight % metal or metallic powder of at least one element selected from the group consisting of Al, Mg, Ca and Si, and 0.1 to 30 weight % MgO and thermosetting resin as a binding material and forming them into the shape of a cylinder or a frustum of a cone using an isostatic press.

2. The well brick of a vessel for molten metal as claimed in claim 1, wherein said thermosetting resin is made by blending at least one resin selected from the group consisting of phenolic resin, urea resin, epoxy resin, and urethane resin.

3. A well brick of a vessel for molten metal, wherein said well brick is made by mixing a raw material comprising an aggregate of $Al_2O_3$ as a main element, 0.3 to 10.0 weight % carbon material, 0.2 to 0.5 weight % metal or metallic powder of at least one element selected from the group consisting of Al, Mg, Ca and Si, and 0.1 to 30 weight %

MgO and thermosetting resin as a binding material and forming them into the shape of a cylinder or a frustum of a cone using an isostatic press, and wherein said vessel for molten metal is one of a ladle for molten metal, a ladle for refining and a tundish.

4. The well brick as recited in claim 3, wherein said thermosetting resin is made by blending at least one resin selected from the group consisting of phenolic resin, urea resin, epoxy resin and urethane resin.

5. A well brick of a vessel for molten metal, wherein said well brick is made by mixing a raw material comprising an aggregate of $Al_2O_3$ as a main element, 0.3 to 10.0 weight % carbon material, 0.2 to 0.5 weight % metal or metallic powder of at least one element selected from the group consisting of Al, Mg, Ca and Si, and 0.1 to 30 weight % MgO and thermosetting resin as a binding material.

* * * * *